US012149533B2

(12) United States Patent
Li et al.

(10) Patent No.: US 12,149,533 B2
(45) Date of Patent: Nov. 19, 2024

(54) GRAPHICAL USER INTERFACES FOR AUTHENTICATION TO USE DIGITAL CONTENT

(71) Applicant: Lenovo (Singapore) Pte. Ltd., Singapore (SG)

(72) Inventors: Scott Wentao Li, Cary, NC (US); Robert James Norton, Jr., Raleigh, NC (US); Robert J. Kapinos, Durham, NC (US); Russell Speight VanBlon, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 68 days.

(21) Appl. No.: 17/189,106

(22) Filed: Mar. 1, 2021

(65) Prior Publication Data
US 2022/0278990 A1    Sep. 1, 2022

(51) Int. Cl.
*H04L 9/40*    (2022.01)
*G06F 3/0482*    (2013.01)
(Continued)

(52) U.S. Cl.
CPC .......... *H04L 63/102* (2013.01); *G06F 3/0482* (2013.01); *G06F 3/04842* (2013.01);
(Continued)

(58) Field of Classification Search
CPC .......... H04N 21/4542; H04N 21/4532; H04N 21/2541; H04N 21/835; H04N 21/4627;
(Continued)

(56) References Cited

U.S. PATENT DOCUMENTS 7,487,132 B2 * 2/2009 Auvenshine ............ G06F 16/00
706/15
8,732,087 B2 * 5/2014 Cohen ................ H04N 21/4402
705/51
(Continued)

FOREIGN PATENT DOCUMENTS

WO    WO-0161508 A1 * 8/2001 ............. G06F 16/00
WO    WO-02104025 A2 * 12/2002 ....... H04N 21/23418

OTHER PUBLICATIONS

C. Chen, K. Lin, Y. Wu and K. Lee, "An Approach of Digital Rights Management for E-Museum with Enforce Context Constraints in RBAC Environments," 2006 IEEE International Conference on Systems, Man and Cybernetics, 2006, pp. 1871-1878, doi: 10.1109/ICSMC.2006.385003. (Year: 2006).*

(Continued)

*Primary Examiner* — Andrew L Tank
(74) *Attorney, Agent, or Firm* — John M. Rogitz; John L. Rogitz

(57) ABSTRACT

In one aspect, at least one device may include at least one processor and storage accessible to the at least one processor. The storage may include instructions executable by the at least one processor to access an image and to execute object recognition using the image to identify at least a first object from the image. The instructions may also be executable to access a database indicating whether use permissions are grantable for various objects and to determine, based on accessing the database, that use permissions are grantable for the first object. The instructions may then be executable to control a display to present a graphical user interface (GUI) on the display, where the GUI may indicate the use permissions for the first object and include a selector that is selectable to initiate secure communication to authenticate
(Continued)

an entity as being granted the use permissions for the first object.

20 Claims, 6 Drawing Sheets

(51) Int. Cl.
*G06F 3/04842* (2022.01)
*G06F 21/16* (2013.01)
*G06F 21/31* (2013.01)

(52) U.S. Cl.
CPC .............. *G06F 21/16* (2013.01); *G06F 21/31* (2013.01); *H04L 63/105* (2013.01); *G06F 2221/2141* (2013.01)

(58) Field of Classification Search
CPC ............... H04N 21/23406; H04N 1/32; H04N 1/32144; H04N 1/3232; H04N 21/83; H04N 21/8358; H04N 1/32149; G06N 3/08; G06V 10/82; G06V 10/72; G06F 16/7837; G06F 21/31; G06F 2221/2141; G06F 21/10; H04L 63/102; H04L 63/105; G06T 1/0021
See application file for complete search history.

(56) References Cited

U.S. PATENT DOCUMENTS

| | | | | |
|---|---|---|---|---|
| 8,803,912 | B1* | 8/2014 | Fouts | G06F 16/444 |
| | | | | 345/629 |
| 8,893,169 | B2* | 11/2014 | Klappert | H04N 21/43074 |
| | | | | 725/28 |
| 9,331,970 | B2* | 5/2016 | Yuen | H04L 51/52 |
| 9,626,493 | B2* | 4/2017 | Cohen | G06F 21/16 |
| 9,715,714 | B2* | 7/2017 | Koch | G06F 3/04842 |
| 9,953,347 | B2* | 4/2018 | Spitz | H04N 21/478 |
| 10,467,507 | B1* | 11/2019 | Hao | G06F 18/2415 |
| 11,120,273 | B2* | 9/2021 | Rabbat | G06V 20/49 |
| 11,546,661 | B2* | 1/2023 | Brannon | G10L 15/26 |
| 2006/0031091 | A1* | 2/2006 | Tarr | G06Q 30/0605 |
| | | | | 705/347 |
| 2007/0143856 | A1* | 6/2007 | Aerrabotu | H04N 21/2541 |
| | | | | 726/28 |
| 2007/0220209 | A1* | 9/2007 | Maeda | H04N 1/00477 |
| | | | | 700/27 |
| 2008/0033812 | A1* | 2/2008 | McKenna | H04N 13/194 |
| | | | | 717/116 |
| 2009/0190189 | A1* | 7/2009 | Suga | H04L 9/321 |
| | | | | 358/474 |
| 2011/0283309 | A1* | 11/2011 | Bliss | G06F 40/106 |
| | | | | 725/25 |
| 2013/0236070 | A1* | 9/2013 | Sliwinski | H04N 21/44218 |
| | | | | 382/118 |
| 2014/0344334 | A1* | 11/2014 | Trachtenberg | H04L 67/1097 |
| | | | | 709/203 |
| 2015/0169207 | A1* | 6/2015 | Mody | G06F 9/451 |
| | | | | 715/763 |
| 2015/0347769 | A1* | 12/2015 | Espinosa | H04L 63/168 |
| | | | | 726/28 |
| 2016/0035055 | A1* | 2/2016 | Perkins | G06Q 50/184 |
| | | | | 705/310 |
| 2016/0112760 | A1* | 4/2016 | Kosseifi | H04N 21/44008 |
| | | | | 725/28 |
| 2017/0053372 | A1* | 2/2017 | Koch | G06F 3/048 |
| 2017/0220209 | A1* | 8/2017 | Bae | H04L 67/02 |
| 2017/0272818 | A1* | 9/2017 | Gattis | H04N 21/4532 |
| 2018/0083978 | A1* | 3/2018 | Pantazelos | G06V 40/172 |
| 2018/0174363 | A1* | 6/2018 | VanBlon | G06T 19/006 |
| 2018/0359529 | A1* | 12/2018 | Hasek | H04N 21/4821 |
| 2019/0196698 | A1* | 6/2019 | Cohen | G10L 15/22 |
| 2020/0005046 | A1* | 1/2020 | Attorre | G06T 7/0002 |
| 2020/0092607 | A1* | 3/2020 | Rechner | G06F 40/242 |
| 2020/0143838 | A1* | 5/2020 | Peleg | G06V 10/764 |
| 2020/0145723 | A1* | 5/2020 | Vaughn | H04N 21/25883 |
| 2020/0242750 | A1* | 7/2020 | Kokkula | G06V 10/82 |
| 2021/0329338 | A1* | 10/2021 | Khov | G06N 3/045 |
| 2022/0132209 | A1* | 4/2022 | Puri | H04N 21/4545 |

OTHER PUBLICATIONS

Christos Douligeris; Dimitrios N. Serpanos, "Securing Digital Content," in Network Security: Current Status and Future Directions , IEEE, 2007, pp. 441-457, doi: 10.1002/9780470099742.ch25. (Year: 2007).*

F. Roesner, T. Kohno, A. Moshchuk, B. Parno, H. J. Wang and C. Cowan, "User-Driven Access Control: Rethinking Permission Granting in Modern Operating Systems," 2012 IEEE Symposium on Security and Privacy, 2012, pp. 224-238, doi: 10.1109/SP 2012.24. (Year: 2012).*

D. Keerthi Chandra, W. Chowgule, Y. Fu and D. Lin, "RIPA: Real-Time Image Privacy Alert System," 2018 IEEE 4th International Conference on Collaboration and Internet Computing (CIC), Philadelphia, PA, USA, 2018, pp. 136-145, doi: 10.1109/CIC.2018. 00029. (Year: 2018).*

Yuan, L. and Ebrahimi, T. (2017), Image privacy protection with secure JPEG transmorphing. IET Signal Process., 11: 1031-1038. https://doi.org/10.1049/iet-spr.2016.0756 (Year: 2017).*

Anonymous, "Use of Facial Recognition to Enable Privacy in Social Networks", ip.com Prior Art Database Technical Disclosure, IPCOM000220581D, Aug. 7, 2012, pp. 1-10 (Year: 2012).*

Gandhi, Shreyansh, et al. "Image matters: scalable detection of offensive and non-compliant content/logo in product images." arXiv preprint arXiv:1905.02234 (2019). (Year: 2019).*

* cited by examiner

GRAPHICAL USER INTERFACES FOR AUTHENTICATION TO USE DIGITAL CONTENT

FIELD

The disclosure below relates to technically inventive, non-routine solutions that are necessarily rooted in computer technology and that produce concrete technical improvements. In particular, the disclosure below relates to graphical user interfaces (GUIs) for authentication to use digital content.

BACKGROUND

As recognized herein, unique digital assets have owners. As also recognized herein, permissions from owners are sometimes needed to validly use these unique digital assets. However, current computing systems lack the technical capability to efficiently grant such permissions when the digital asset forms part but not all of a given piece of digital content. Accordingly, there are currently no adequate solutions to the foregoing computer-related, technological problem.

SUMMARY

Accordingly, in one aspect a first device includes at least one processor and storage accessible to the at least one processor. The storage includes instructions executable by the at least one processor to access an image and execute object recognition using the image to identify at least a first object from the image. The instructions are also executable to access a database indicating whether use permissions are grantable for various objects and determine, based on accessing the database, that use permissions are grantable for the first object. The instructions are also executable to control a display to present a graphical user interface (GUI) on the display, where the GUI indicates the image and indicates the use permissions for the first object. The GUI also includes a selector that is selectable to initiate secure communication to authenticate an entity as being granted the use permissions for the first object.

In some examples, the selector may be a first selector and the instructions may be executable to present a second selector on the display. The second selector may be selectable to replace the first object as appearing in the image with a second object different from the first object. The second object may not be subject to use permissions. The second selector may be different from the first selector.

Also, in some examples, the instructions may be executable to, responsive to authenticating the entity as being granted the use permissions for the first object, embed electronic tracking data in a file including the image. The electronic tracking data may indicate that the image is associated with the use permissions for the first object. The electronic tracking data may be embedded in the body of the image and/or in a header for the image. Additionally, in some examples the instructions may be executable to embed an encrypted version of the electronic tracking data in the file. Also, in some examples, the electronic tracking data may include an image identification (ID) associated with the image. The image ID may be assigned by a second device.

In some example implementations, the first device may include a server that communicates with a client device different from the server to present the GUI on the display, where the display may be disposed on the client device.

Also, in some example implementations, the first device may include a client device that communicates with a server to execute the instructions based on communication with the server.

In another aspect, a method includes accessing a digital image and executing object recognition using the digital image to identify at least a first object from the digital image. The method also includes controlling a display to present a graphical user interface (GUI) on the display, where the GUI indicates use permissions for the first object. The GUI also includes a selector that is selectable to initiate secure communication to authenticate an entity as being granted the use permissions for the first object.

In some example embodiments, the method may further include accessing data indicating whether use permissions are grantable for various objects and determining, based on accessing the data, that use permissions are grantable for the first object. In these embodiments, the method may then include controlling the display to present the GUI based on determining that use permissions are grantable for the first object. The data may be stored in a database that itself may be stored at a server accessible over the Internet.

Additionally, in some example implementations the method may include, responsive to facilitating the authenticating of the entity as being granted the use permissions for the first object, embedding electronic tracking data in a file including the digital image. The electronic tracking data may indicate that the digital image is associated with the use permissions for the first object. Even further, in some examples the method may include embedding the electronic tracking data in the body of the digital image and/or in a header for the digital image.

In still another aspect, at least one computer readable storage medium (CRSM) that is not a transitory signal includes instructions executable by at least one processor to access digital content. The instructions are also executable to control a display to present a graphical user interface (GUI) on the display, where the GUI indicates use permissions are associated with the digital content and includes a selector that is selectable to initiate communication to authenticate an entity as being granted the use permissions associated with the digital content.

In some example implementations, the digital content may be first digital content and the use permissions may relate to at least one restriction on which the first digital content may be used. In these implementations, the instructions may be executable to present, on the GUI, an option to use alternate digital content that is not subject to the same restriction on which the first digital content may be used, with the alternate digital content being different from the first digital content.

Also, in some example embodiments the digital content may include a digital image and the instructions may be executable to execute object recognition using the digital image to identify at least a first object from the digital image and a second object from the digital image. The second object may be different from the first object. In these example embodiments, the instructions may then be executable to control the display to present the GUI on the display, where the GUI may include a selector that is selectable to initiate communication to authenticate the entity as being granted use permissions associated with the first object but not associated with the second object.

Additionally, in various examples the digital content may include video content and/or audio content.

The details of present principles, both as to their structure and operation, can best be understood in reference to the accompanying drawings, in which like reference numerals refer to like parts, and in which:

DETAILED DESCRIPTION

Figure 1:
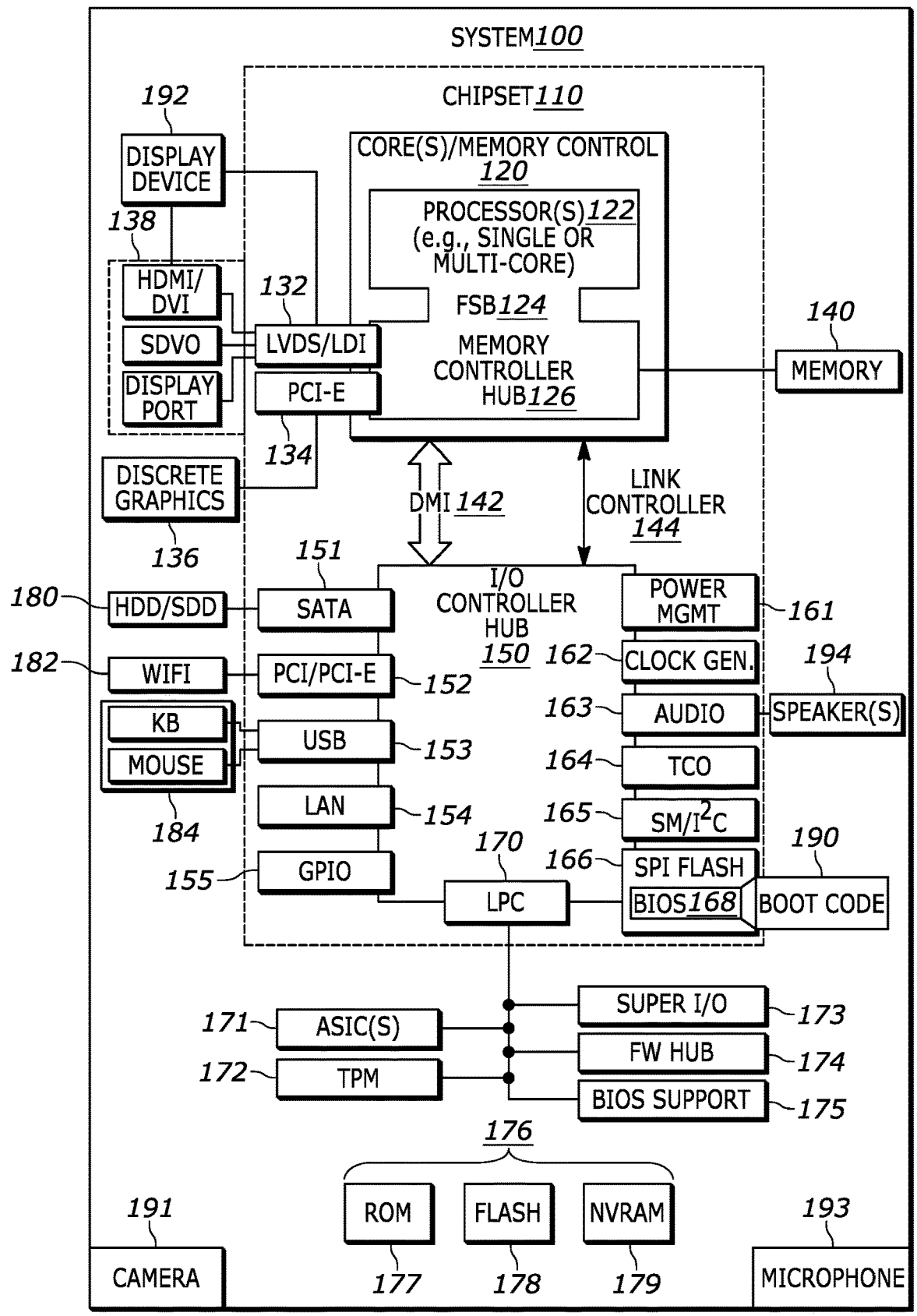
FIG. 1 is a block diagram of an example system consistent with present principles.

Among other things, the disclosure below discusses presentation of graphical user interfaces (GUI) and authentication related to use permissions.

For example, an end user may wish to upload a digital image taken using their cell phone camera, but the image might show a protectable object within the image. Thus, a software application executing at the device may execute a comprehensive image search using object recognition or even a reverse image search to identify the protectable content (e.g., an object or person's likeness). A database of objects and people may then be accessed once the content has been identified, and then a user may be taken to a screen to accept use permissions/conditions for the content as might be indicated in the database. The application executing at the end-user's device may then facilitate the grant of use permissions for the content, assuming the user accepts, or abort if the user does not accept. Assuming the user accepts, use permissions may then be embedded in the image metadata.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one or more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include an audio receiver/microphone 193 that provides input from the microphone 193 to the processor 122 based on audio that is detected consistent with present principles. The system 100 may also include a camera 191 that gathers one or more images and provides the images and related input to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
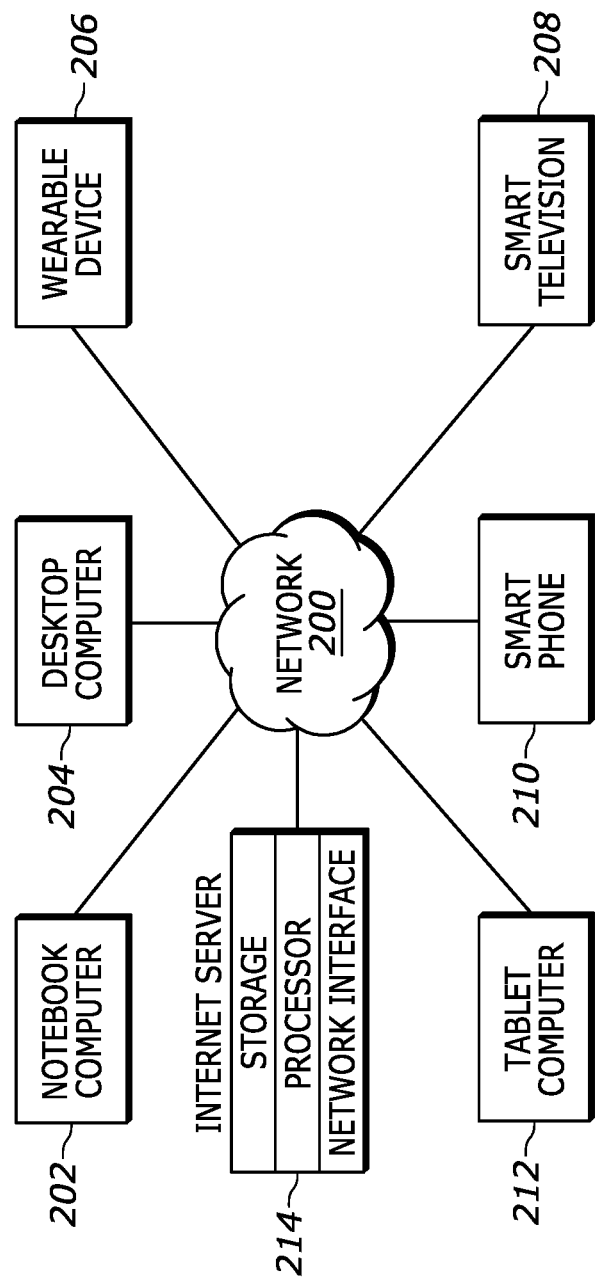
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles (e.g., securely communicate for the granting of use permissions).

Figure 3:
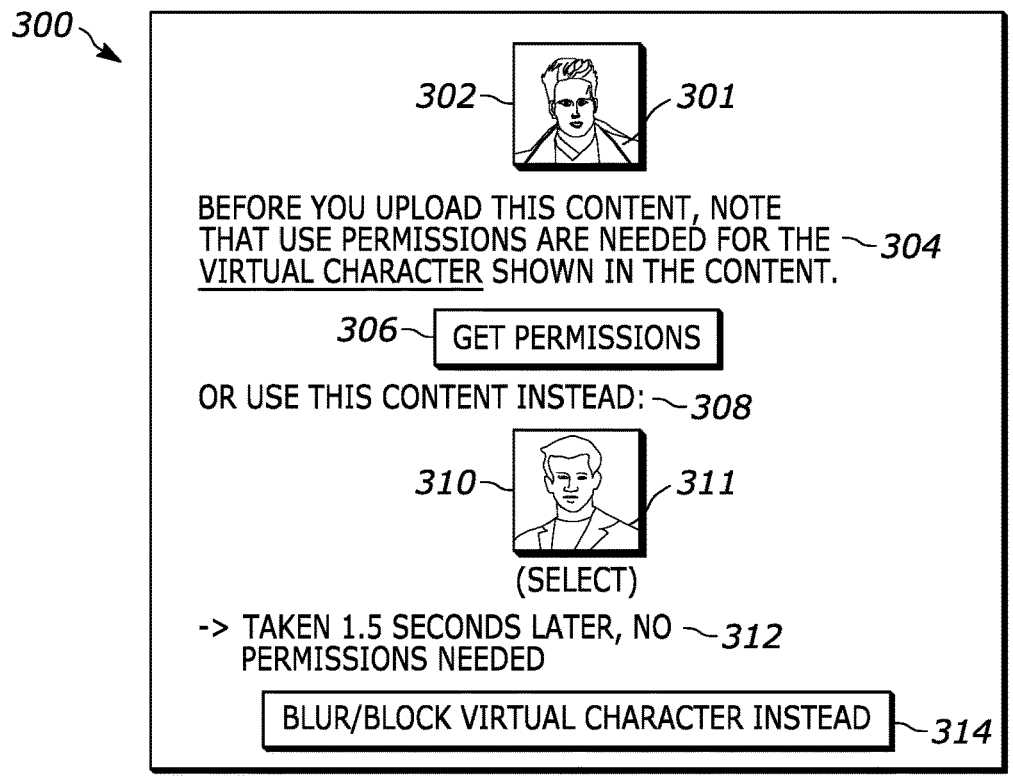
FIG. 3 shows an example graphical user interface (GUI) that indicates that use permissions are grantable for a certain digital image consistent with present principles.

Now describing FIG. 3, suppose an end-user has taken a photograph using a camera on his or her own personal device (e.g., a client device such as a smartphone or laptop computer). Also suppose the user wishes to upload the photograph to a publicly-accessible personal website or social networking service for commercial use, for example. After the photograph is generated at the client device, the client device may analyze the photograph, and/or or use a cloud service to analyze the photograph, for recognizable objects, logos, people, etc. potentially subject to use permissions. Note that in some examples, many objects may be recognized and identified from the photograph as not having use permissions associated with them even if other objects in the photograph are recognized and identified as having use permissions associated with them.

Bearing this in mind, responsive to the device taking the photograph, or responsive to a user command to upload the photograph to the website or social networking service after the photograph is taken and stored locally at the client device, the client device and/or cloud server in communication with the client device may analyze the photograph and control the display of the client device to present a graphical user interface (GUI) such as the example GUI 300 shown in FIG. 3.

Thus, as shown the GUI 300 may include a thumbnail or preview 302 of the photograph/digital image that was taken. As also shown in FIG. 3, the thumbnail 302 may show one or more objects which, in this case, includes a digitally-generated virtual character 301 as presented on a separate TV display that might also be shown in the photograph. The character 301 might be, for example, from a video game or electronic program released by a company or other third party that controls the image rights to the character 301 to thus exclude others from using the likeness of the character 301 without its permission. As another example, the virtual character 301 might be in the photograph itself if the photograph shows a tangible, real-world stuffed animal version of the virtual character 301.

As also shown in FIG. 3, the GUI 300 may further include a prompt 304 indicating that before the user uploads the image, the user should receive a grant of use permissions to publicly use the virtual character 301 for the user's own purposes (e.g., publishing to the user's personal website or social networking account) since the character 301 has been identified by the client device's analysis as being subject to use permissions. Note that the words "virtual character" as included as part of the prompt 304 are underlined to highlight to the user precisely what from the image has been identified as subject to use permissions. Also note that if more than one object in the photograph were determined by the device/server to be subject to use permissions (possibly as grantable by different third-party owners), then each object may be separately highlighted via the prompt 304.

In any case, assuming the user still wishes to use the image and hence get use permissions to use the virtual character 301 publicly for his/her own purposes, the user may select the selector 306 shown in FIG. 3. In some examples, the selector 306 may include text indicating use permissions for the virtual character 301 and may be selected using touch or cursor input. Then responsive to the selector 306 being selected, the client device and/or server in communication therewith may control the display of the client device to present the GUI 400 of FIG. 4.

But before describing FIG. 4, other parts of FIG. 3 will be described. So still in reference to FIG. 3, also assume the user took a few other photographs before and/or after the photograph shown in the thumbnail 302. In this case, the user's device and/or server may suggest one or more alternate photographs from the group of other photographs so long as, for example, timestamps for each additional photograph indicate that the additional photograph was taken within a preset threshold period of time of when the photograph represented by the thumbnail 302 was generated (as may be determined by comparing timestamps for the respective photographs). For example, the threshold period of time may be five seconds before or after the subject photograph.

In such a case, the GUI 300 may further include a prompt 308 along with a second thumbnail image 310 of a different photograph taken within the threshold period of time of the photograph shown in the thumbnail image 302 being generated. The thumbnail image 310 may be selectable from the GUI 300 to replace the photograph shown in the thumbnail image 302 with the photograph shown in the thumbnail image 310 for the upload itself. An indication 312 may also be presented on the GUI 300 and indicate additional information about the photograph shown in the thumbnail image 310, such as that it was generated by the same camera on the user's device one and a half seconds after the photograph shown in the thumbnail image 302 was generated. If applicable, the indication 312 may also indicate that no use permissions would be needed to publicly use the photograph shown in the thumbnail image 310 and that it is cost-free to use (possibly because it does not even show the virtual character 301 shown in the other photograph). However, also if applicable, the indication 312 might indicate something different such as that use permissions might still be required for an alternate virtual character 311 shown in the image corresponding to the thumbnail 310 but that the use permissions might be different (e.g., cost less to license).

Still further, in some examples the GUI 300 may also include a selector 314. The selector 314 may be selectable by the end-user to command the client device/server to use photo editing software such as Photoshop, Instagram, or VSCO to alter the photograph itself by blurring or blacking-out the virtual character 301 (and any other objects from the photograph that might be subject to use permissions) while leaving other parts of the photograph unaltered. The original photograph may then be deleted wherever it was stored, and the altered photograph may be stored in its stead at the same file path and with the same file name. Alternatively, the original photograph may be maintained in storage and the altered photograph may be assigned a different name but still stored in the same folder as the original photograph (or stored at another location). Thus, by performing the blurring or blocking of the character 301, the altered photograph may no longer be subject to use permissions.

Figure 4:
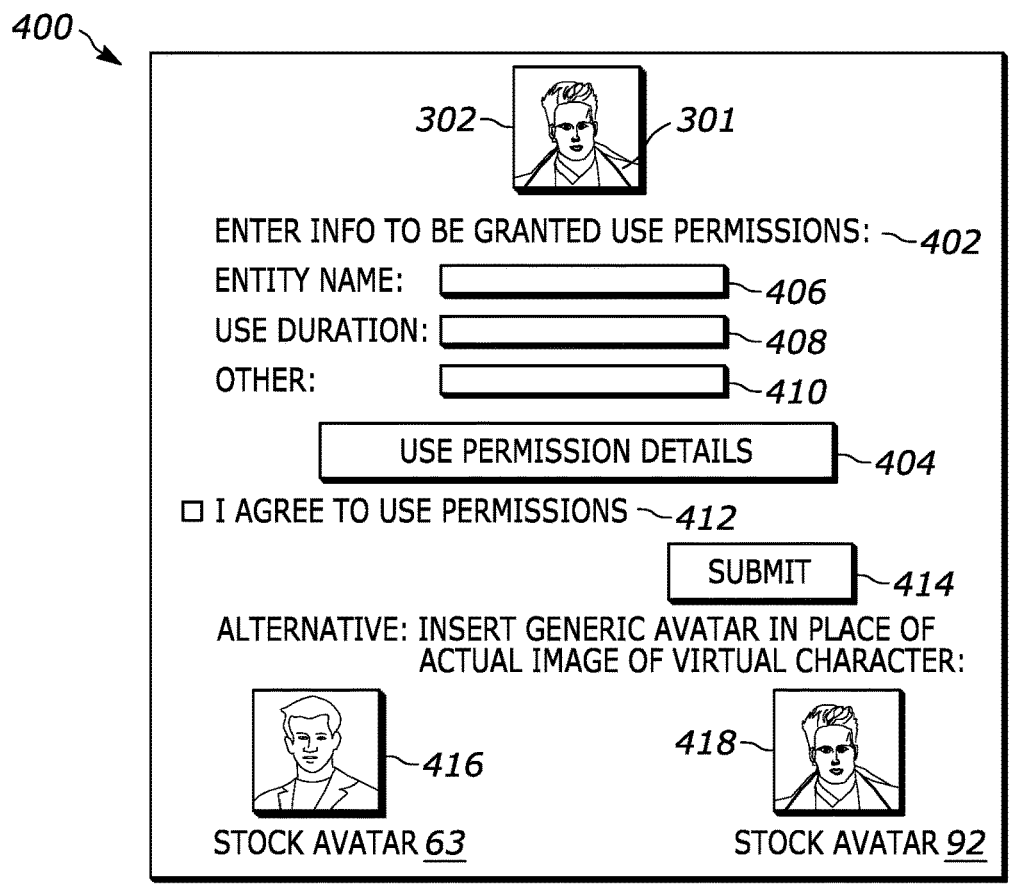
FIG. 4 shows an example GUI that may be used to authenticate an entity as being granted the use permissions consistent with present principles.

Continuing the detailed description in reference to FIG. 4, it shows another example GUI 400. The GUI 400 may be presented, for example, responsive to selection of the selector 306, and/or based on the server or client device of FIG. 3 otherwise determining that use permissions may be required for the photograph/image shown in the thumbnail 302. Thus, the client device by itself or in conjunction with the server may control its display to present the GUI 400.

As shown in FIG. 4, the GUI 400 may indicate the photograph subject to use permissions by presenting the thumbnail 302 again, by presenting text or a file path indicating that photograph via text for the file path, or by indicating the photograph another way. As also shown in FIG. 4, the GUI 400 may also indicate the use permissions for the virtual character 301 by way of a prompt 402 for the end-user to enter the end-user's information to be granted use permissions. The use permissions may also be indicted by way of a selector 404 that may be selectable to command the device to present another GUI that may explicitly list all of the use permissions for the digital asset/virtual character 301 (e.g., cost to license, terms, conditions, etc.). Other ways to indicate the use permissions may also be used.

As also shown in FIG. 4, beneath the prompt 402 may be one or more input fields for the end-user to manually input various types of information that the owner of the rights to the virtual character 301 might require to grant use permissions for the virtual character, assuming the end-user's device has not already auto-filled one or more these fields based on the end-user already having a service account set up that already indicates the requested type(s) of information. For example, the input fields might be auto-filled with certain information if the user is attempting to upload the photograph to a social networking site that already has information stored for the user's social networking profile that might be used to auto-fill one or more of the fields.

But regardless of whether auto-filled or not, note that an entity name may be entered into input field 406, where the entity name may be for the entity to which the use permissions should be granted (e.g., the first and last name of the end-user himself/herself, the name of the user's company, etc.). As another example, a duration during which the end-user desires the use permissions to remain in effect for authorized use by the user may be entered into input field 408, whether the duration is indefinite or for a predefined period of time such as one month or one year. Other fields may also be included as appropriate, depending on what information the owner of the rights to the virtual character 301 might require for use permissions to be granted. For example, input field 410 might be used to provide payment information for the end-user to pay for the right to use the virtual character 301 as shown in the photograph for a specified duration according to the use permissions.

Once all information requested by the owner has been provided by the end-user/entity or auto-filled, the check box next to the text 412 indicating "I agree to use permissions" may be checked for the end-user to provide affirmative confirmation that the end-user is agreeing to be bound by the use permissions. After the box is checked, the user may select the submit selector 414 shown in FIG. 4 to electronically submit the information entered into the fields 406-410 to whatever server or cloud computer might be facilitating the grant of the use permissions. Thus, in some examples the submit selector 414 may be selectable to initiate secure communication with the server or cloud computer to submit the information provided in the fields 406-410 and authenticate the requesting entity as being granted the use permissions for the virtual character 301. This might include registering the entity according to the provided information, verifying the entity and the information provided, creating a profile or account for the entity, processing payment information, etc. The secure communication itself might include encrypted communication (e.g., symmetrical, or asymmetrical key encryption) and other types of secure communication such as identity-based network communication.

Still in reference to FIG. 4, also note that in some examples the user's device and/or server may suggest an alternate graphical or virtual object that may be inserted into the photograph represented by the thumbnail 302 at a position in the photograph corresponding to the virtual character 301 to replace the virtual character 301 so that none of the virtual character 301 is shown in the photograph after insertion of the alternate. This may be suggested so that use permissions would no longer be needed (or might be cheaper) to then use the photograph publicly. The alternate virtual object may be inserted into the photograph to replace the virtual character 301 using a photo editing application such as Photoshop, Instagram, or VSCO, for example. The alternate virtual object(s) themselves from which the end-user might choose may be ones uploaded to the server or cloud computer (or downloaded to the end-user's client device) by a system administrator or the developer of whatever software application might be used for the processes discussed in relation to FIGS. 3 and 4.

In the present example, two example stock avatar images 416, 418 are shown on the GUI 400. Each respective avatar image 416, 418 may be selectable from the GUI 400 to command the client device and/or server to, without additional user input, automatically replace the virtual character 301 in the photograph with the avatar of the selected image 416, 418 and to automatically save the altered image to the client device or cloud storage (e.g., as a new image, or to replace the one showing the character 301).

Figure 5:
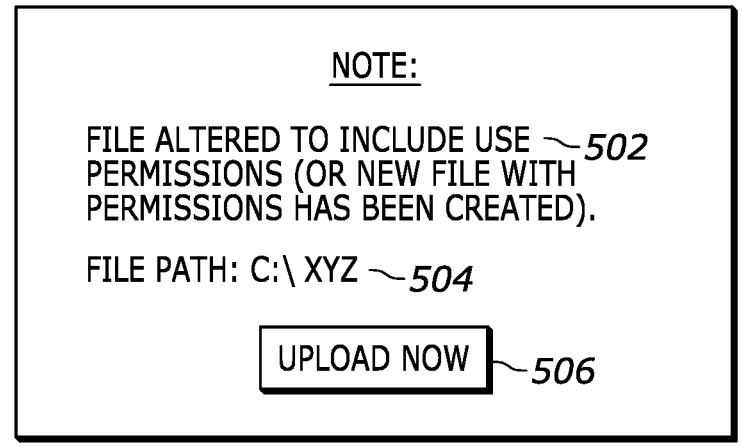
FIG. 5 shows an example GUI indicating an image file has been embedded with use permissions consistent with present principles.

Continuing the detailed description in reference to FIG. 5, it shows another example GUI 500 that may be presented on the display of the end-user's device under control of that device's processor and/or a server communicating with the device. The GUI 500 may be presented responsive to authenticating/confirming the end-user (or other entity) as being granted use permissions for the virtual character 301 for use in the photograph described above. Additionally, or alternatively, the GUI 500 may be presented responsive to the photograph itself being altered to indicate the use permissions after they were granted, as will now be described.

Thus, as indicated by the prompt 502, responsive to authenticating the end-user as being granted the use permissions, the end-user device and/or server may embed electronic tracking data in a file including the photograph, such as a joint photographic experts' group (JPEG) file, portable document format (PDF) file, graphics interchange format (GIF) file, or tagged image file format (TIFF) file. The file that is altered to include the electronic tracking data may be the original image file generated by the client device's camera and/or camera application, or the original image file may be left unaltered and instead a copy of the original image file may be generated and then embedded with the electronic tracking data. In either case, the image file with the embedded data may be stored locally at the client device and/or remotely at the server or cloud storage. Accordingly, also shown in FIG. 5, the GUI 500 may include an indication 504 of the file path for the image with the embedded data so that the end-user may be able to determine where the image file with the embedded tracking data might have been automatically stored.

The electronic tracking data itself that is embedded in the image file may indicate that the photograph is associated with the use permissions for the virtual character 301 by, for example, indicating license information for the virtual character 301 as well as a transaction identification (ID). The data may also indicate the entity to whom the use permissions were granted in relation to the character 301 and for how long (e.g., include a timestamp(s) indicating the duration), indicate contact information for the owner of the virtual character 301, indicate an image identification (ID) associated with the image, and possibly indicate other information that may be used to track use of the virtual character 301 online as shown in the end-user's photograph. In some examples, the image ID may be a unique ID for the end-user's photograph as determined and assigned by the server or cloud computer with which the end-user's device communicated to obtain the use permissions.

As an example of tracking use of the virtual character 301 as shown in the photograph, note that tracking may be automatically performed by any photo-sharing application or website to which the photograph might be uploaded based on the application or website being preprogrammed to recognize and validate the embedded data prior to publishing the photograph publicly. Additionally, or alternatively, the owner of the virtual character 301 itself may come across the photograph online, right-click on the photograph, and then select an option from a drop-down menu to view the properties or code of the corresponding image file to determine if the appropriate tracking data was embedded and hence shown upon request (which may signal that use permissions were in fact received to use the photograph publicly).

The tracking data may be embedded in the body of the photograph/image file itself or, in some examples, in a header of the photograph/image file. In some example implementations, the embedded electronic tracking data may even be encrypted using a symmetrical or asymmetrical encryption algorithm so that the encrypted version of the tracking data cannot be deciphered without the appropriate decryption key. This may help prevent unauthorized parties from accessing and recognizing the electronic tracking data in the user's photograph, altering and/or replicating some or all of it, and then embedding the altered/replicated version in a different publicly-available photograph also showing the virtual character 301 to make it look as though use permissions were granted for the different photograph even though they were not in reality.

Concluding the description of FIG. 5, also note that a selector 506 may be presented on the GUI 500. The selector 506 may be selectable by the end-user to command the device or server to upload the photograph with the embedded tracking data to whatever public online website, forum, social networking service, etc. to which the end-user is attempting to upload the photograph.

Figure 6:
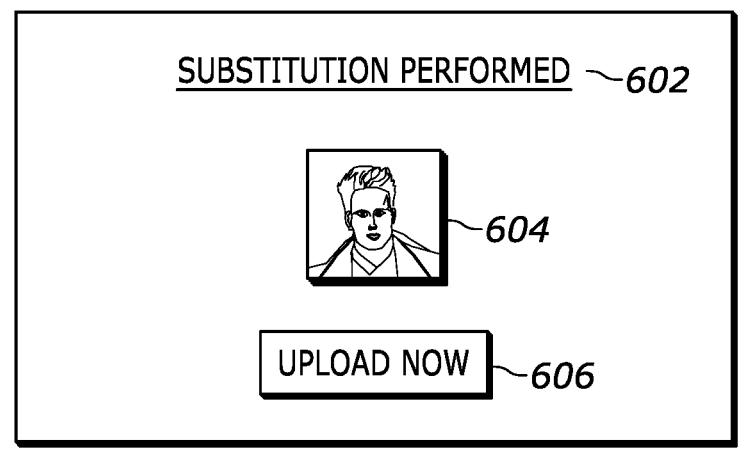
FIG. 6 shows an example GUI indicating an image file has had an asset subject to use permissions replaced with another digital asset consistent with present principles.

Now describing FIG. 6, suppose the end-user selected one of the images 416, 418 from the GUI 400 of FIG. 4 in order to insert an alternate graphical object into the photograph represented by the thumbnail 302 to replace the virtual character 301 as described above. Responsive to replacement of the virtual character 301 in the photograph with the avatar of the selected image 416, 418 based on selection of one of the images 416, 418 themselves, the GUI 600 of FIG. 6 may be presented on the display of the end-user's device. The GUI 600 may include a prompt 602 that the substitution of the virtual character 301 with one of the avatars of the images 416, 418 has been executed.

The GUI 600 may also present the altered image itself (e.g., a thumbnail version 604 as shown) so that the rest of the image besides the portion showing the virtual character 301 remains more or less unaltered but the character 301 itself has been removed and replaced with "stock avatar 92" as was represented on the GUI 400 via the selector 418 (which is assumed in this case to be the replacement avatar image selected by the user from the GUI 400).

As also shown in FIG. 6, a selector 606 may be presented on the GUI 600. The selector 606 may be selectable by the user to command the device or server to upload the altered photograph which now includes the stock avatar 92 (and does not include the virtual character 301) to whatever public online website, forum, social networking service, etc. to which the end-user is attempting to upload the photograph.

Figure 7:
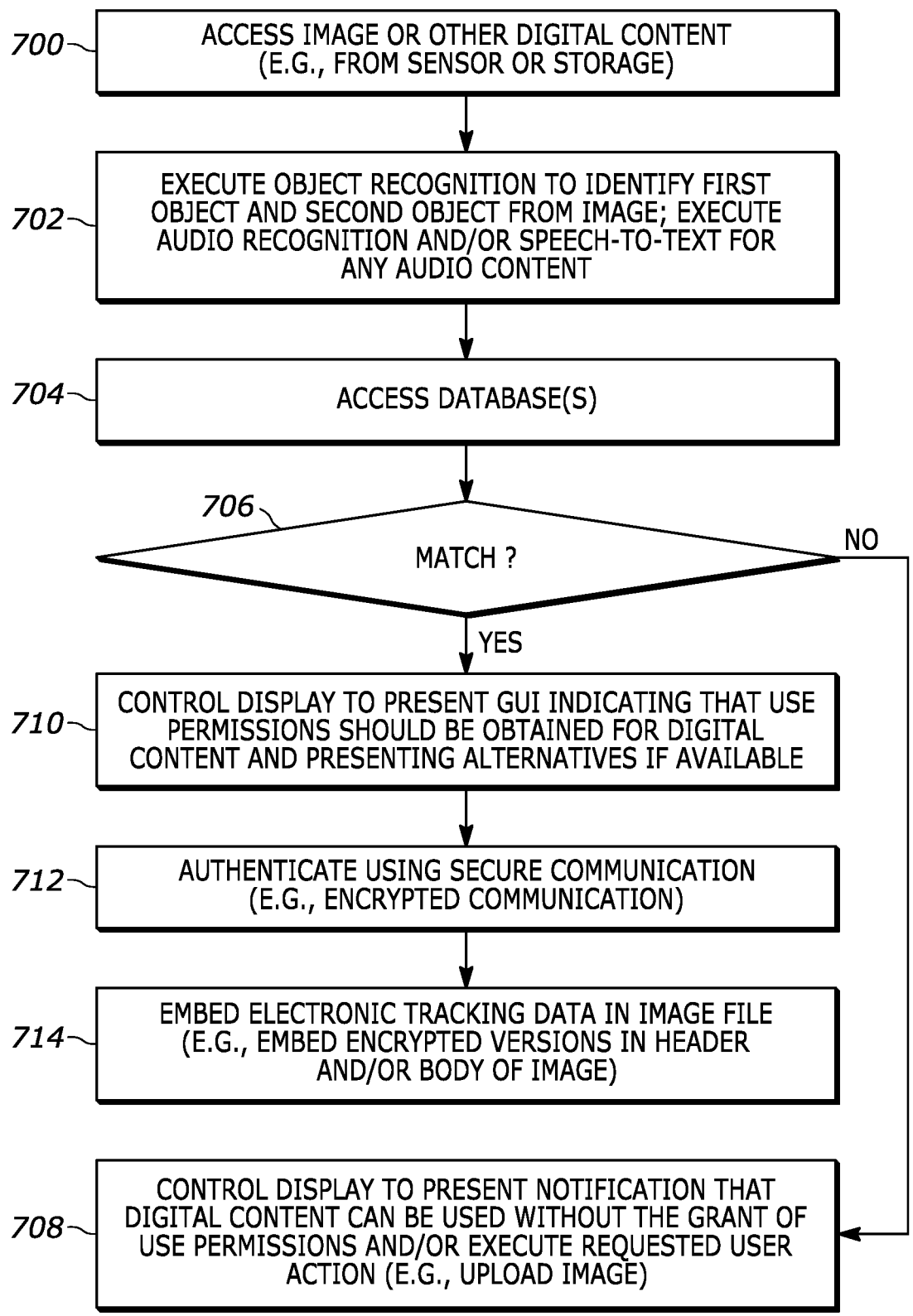
FIG. 7 illustrates example logic in example flow chart format consistent with present principles.

Referring now to FIG. 7, it shows example logic consistent with present principles that may be executed by a device such as the system 100, a client device of the user as described above, and/or a server or cloud computer, in any appropriate combination. Beginning at block 700, the device may access a still image or other digital content such as a video or audio content (e.g., audio content like a podcast or sound recording that has no corresponding visual portion). The digital content may be accessed from local storage or from remote storage after, for example, being generated by a camera (for visual content) and/or microphone (for audio content) on the end-user's device.

From block 700 the logic may then proceed to block 702 where the device may, in the case of a still image or video, execute object recognition to identify one or more individual proprietary objects as shown in the still image or each image frame of the video. As an example, first and second proprietary objects may be identified from a single still image at block 702, such as a real-life tangible branded soda can and a virtual character such as the character 301 described above. Also, at block 702 but where audio forms all or part of the digital content, audio recognition technologies such as digital assistants, speech to text software, and natural language processing may be executed on the audio to identify any proprietary audio content such as copyright-protected music, written material reproduced audibly, or spoken words.

The logic may then move to block 704 where the device may access one or more databases indicating whether use permissions are respectively grantable for the various proprietary objects identified from the still image or video (or grantable for various proprietary audio components that might have also been identified at block 702). Thus, the device may search the database(s) to determine, at diamond 706, whether there is a match of the identified proprietary visual object(s) or audio from the digital content to an entry in the database. The database(s) themselves may be stored at a server accessible over the Internet and may have been configured by a system administrator or manager tasked with managing use permissions for various proprietary assets (digital or otherwise). In some examples, each database entry for a given proprietary object may also be configured to indicate alternate digital content or real-life images that do not require use permissions so that those alternates may be recommended to the user (e.g., via a GUI like the GUI 400 described above).

Additionally, note that in some examples the database(s) may be configured by individual people or entities to register their own proprietary assets in the database(s) for the grant of corresponding use permissions to others. Note that the proprietary assets themselves might include, but are not limited to, individual intangible digital assets such as a virtual character, an entire piece of digital content such as a photograph, other intangible assets like logos and company/product names, and even tangible assets to be protected with use permissions consistent with present principles (such as a painting or work of art). For example, an "owner" GUI may be presented on an owner's device through which the owner of a proprietary asset may upload or indicate the asset and then set use permissions (and possibly associated fees) for others to use the asset in publicly-available digital files.

Still in reference to FIG. 7, note that no match from the database(s) being determined at diamond 706 may cause the logic to proceed to block 708. At block 708 the device may control a display to present a notification that the digital content (or other asset) can be used without the grant of use permissions. Additionally, or alternatively, a negative determination at diamond 706 may also cause, at block 708, the device to execute the requested user action itself (such as uploading a still image to a publicly-available personal web site).

However, note that a match being determined at diamond 706 would indicate that use permissions are required and grantable for the identified digital object(s) or audio component (or other asset), and hence the logic may proceed to block 710 instead. Additionally, note that a different set of use permissions may be required and grantable for each identified object or component of a single piece of digital content, and hence different sets of permissions may ultimately be granted to and associated with the same piece of digital content based on multiple matches being identified using the database(s).

Then once the logic arrives at block 710, the device may control the display to present a GUI indicating that use permissions should be obtained for one or more aspects of the digital content, with the GUI also possibly presenting alternative objects/assets not subject to use permissions (or subject to cheaper use permissions) that might replace the identified proprietary object or audio component. For example, the GUI 300 of FIG. 3 or the GUI 400 of FIG. 4 may be presented at block 710. Also note here that if the proprietary component that is to be replaced is an audio component, a generic or stock audio component may be suggested via the GUI to replace any proprietary audio component identified from the digital content.

From block 710 the logic may then proceed to block 712. At block 712 the device may authenticate the entity seeking the use permissions, such as an end-user or associated company seeking to publicly use the digital content as described above. Authentication may occur using secure communication such as encrypted communication as also described above. Additionally, note that if multiple different objects/assets shown in the digital content are associated with different use permissions, as part of authentication the user might be requested to pay different fees to get different use permissions for each one (e.g., either as a single combined payment or by paying for each set of permissions individually).

After block 712 the logic may proceed to block 714. At block 714 the device may embed electronic tracking data in the image file (or audio file, or video file, as appropriate) as described above. E.g., the tracking data may be embedded in the header or body of the digital content for each set of use permissions that might have been granted for each proprietary asset identified from the digital content (while no use permissions would be embedded for identified assets that were not matched to an entry in the database(s)).

Figure 8:
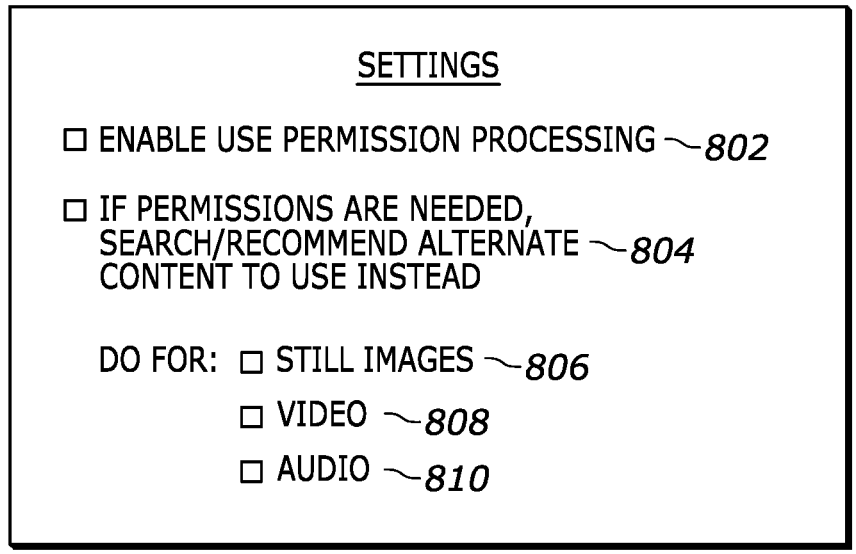
FIG. 8 shows an example GUI for configuring one or more settings of a device to operate consistent with present principles.

Now describing FIG. 8, it shows an example GUI 800 that may also be presented on the display of a client device such as the smartphone, tablet computer, desktop computer, wearable, or laptop of an end-user consistent with present principles. The GUI 800 may be navigated to via a settings menu of the device in order to configure one or more settings of the device to operate consistent with present principles. Each option to be discussed below may be selected by directing touch or cursor input to the respective check box adjacent to the respective option, though other methods of selection may also be used.

As shown in FIG. 8, the GUI 800 may include a first option 802 that may be selectable to set or enable the device itself, and/or particular software application stored at the device, to seek any identifiable use permissions for digital content prior to publishing the content consistent with present principles. For example, selection of the option 802 may set or configure the device to, in the future, execute the logic of FIG. 7 as well as present the GUIs of FIGS. 3-6 and perform the associated functions described in relation to those figures.

As also shown in FIG. 8, the GUI 800 may include a second option 804 that may be selectable to set or configure the device to specifically search for and recommend non-protected or non-proprietary alternate content/assets to use instead of proprietary content/assets that are associated with use permissions. For example, selection of the option 804 may configure the device to, in the future, provide recommendations like the avatar images 416, 418 described above.

Also, in some examples, the GUI 800 may include options 806, 808, and 810. The option 806 may be selectable to implement present principles (e.g., execute the logic of FIG. 7) for still images. The option 808 may be selectable to implement present principles for video content. The option 810 may be selectable to implement present principles for audio content.

Moving on from FIG. 8, also note more generally that video content may be processed to determine a duration during which components or assets subject to use permissions are shown so that use permissions may be paid for on a cost-per-scene basis or paid for proportional to the length of use within the video (e.g., cost per second or per minute that the asset is shown in the video).

Also note consistent with present principles that the application executing at the end-user's device may pick between various images (e.g., generated within a threshold time of each other as set forth above) and then recommend, via a GUI like the GUI 300, an image having a lowest cost for associated use permissions from among the various images. Moreover, if the user wished to upload a certain image for public display online, a system operating consistent with present principles might choose a best alternate image (e.g., generated within the threshold time) based on other criteria as well. For example, user preferences for the alternate image to still show/include a specific brand of product, and/or a user preference for the alternate image to not show/include a competitor's product, may both be used. These preferences might be specified by selecting respective options from the GUI 800, for example, to set the device to then suggest alternate images accordingly. As another example, the system might recommend an alternate image based on an object identified from the user's desired image being restricted per its use permissions from public use in a specific territory or country in which the user's desired image would be published, and/or restricted from publishing as uploaded by a device (e.g., the user's device) that is currently located a restricted territory or country, and so an alternate image that is not subject to such location-based restrictions may be recommended (e.g., if also generated within the threshold time).

Still further, in some examples artificial intelligence employing one or more artificial neural networks (e.g., action recognition using deep or convolutional neural networks) may be used to identify actions a person or other entity within digital content might be performing in relation to a proprietary asset to determine if the action is one specified by an owner of the asset as to not be associated with the asset itself (e.g., a lewd, obscene, or offensive action such as "flipping the bird"). In such an instance, use permissions may be refused responsive to identifying the action even if they would be otherwise grantable. Thus, banned actions might also be included in the databases described herein in order for the device/server to determine that the grant of use permissions should be refused. However, also note that in this scenario the device might still recommend alternate (possibly stock) assets to replace the one subject to use permissions that are being refused.

It may now be appreciated that present principles provide for an improved computer-based user interface that increases the functionality, ease of use, and efficiency of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A first device, comprising:
   at least one processor; and
   storage accessible to the at least one processor and comprising instructions executable by the at least one processor to:
   access one or more images from a video;
   execute action recognition using the one or more images to identify at least a first action from the one or more images;
   access a database comprising plural entries, each entry of the plural entries indicating a respective proprietary object and one or more respective actions that are banned from being associated with the respective proprietary object in digital content;
   match a first object shown in the video to a first entry of the plural entries;
   determine, based on one or more respective actions indicated in the first entry as being banned from being associated with the respective proprietary object for the first entry, that the first action is banned from being shown in the video with the first object; and
   based on the determination, control a display to present a graphical user interface (GUI) on the display, the GUI comprising a selector that is selectable to command the first device to substitute the first object as appearing in the video with a second object different from the first object.

2. The first device of claim 1, wherein the instructions are executable to:
   responsive to authenticating an entity as being granted use permissions to show the first object in the video, embed electronic tracking data in a file comprising the video, the electronic tracking data indicating that the video is associated with the use permissions for the first object.

3. The first device of claim 1, wherein the first device comprises a server that communicates with a client device different from the server to present the GUI on the display, the display being disposed on the client device.

4. The first device of claim 1, wherein the first device comprises a client device that communicates with a server to execute the instructions based on communication with the server.

5. The first device of claim 1, wherein the action recognition is executed using an artificial neural network (ANN).

6. The first device of claim 1, wherein the determination that the first action is banned from being shown in the video with the first object is executed responsive to the one or more images being generated using a camera.

7. The first device of claim 1, wherein the respective proprietary object for the first entry is established by a person's likeness.

8. The first device of claim 1, wherein the GUI also suggests, as a replacement for the one or more images from the video, one or more alternate images that were generated within a preset threshold period of time of when the one or more images from the video were generated.

9. The first device of claim 8, wherein the instructions are executable to:

use image timestamps to determine that the one or more alternate images were generated within the preset threshold period of time of when the one or more images from the video were generated.

10. A method, comprising:

accessing one or more images from a video;

executing action recognition using the one or more images to identify at least a first action from the one or more images;

accessing a database comprising plural entries, each entry of the plural entries indicating a respective proprietary object and one or more respective actions that are banned from being associated with the respective proprietary object in digital content;

matching a first object shown in the video to a first entry of the plural entries;

determining, based on one or more respective actions indicated in the first entry as being banned from being associated with the respective proprietary object for the first entry, that the first action is banned from being shown in the video with the first object; and based on the determining, controlling a display to present a graphical user interface (GUI) on the display, the GUI comprising a selector that is selectable to command a device to substitute the first object as appearing in the video with a second object different from the first object.

11. The method of claim 10, wherein the determining that the first action is banned from being shown in the video with the first object is executed responsive to the one or more images being generated using a camera.

12. The method of claim 10, wherein the respective proprietary object for the first entry is established by a person's likeness.

13. The method of claim 10, wherein the GUI also suggests, as a replacement for the one or more images from the video, one or more alternate images that were generated within a preset threshold period of time of when the one or more images from the video were generated.

14. The method of claim 13, comprising:

using image timestamps to determine that the one or more alternate images were generated within the preset threshold period of time of when the one or more images from the video were generated.

15. At least one computer readable storage medium (CRSM) that is not a transitory signal, the computer readable storage medium comprising instructions executable by at least one processor to:

access one or more images from a video;

execute action recognition using the one or more images to identify at least a first action from the one or more images;

access a database comprising plural entries, each entry of the plural entries indicating a respective proprietary object and one or more respective actions that are banned from being associated with the respective proprietary object in digital content;

match a first object shown in the video to a first entry of the plural entries;

determine, based on one or more respective actions indicated in the first entry as being banned from being associated with the respective proprietary object for the first entry, that the first action is banned from being shown in the video with the first object; and based on the determination, substitute the first object as appearing in the video with a second object different from the first object.

16. The at least one CRSM of claim 15, wherein the first action is identified as one or more of: a lewd action, an obscene action, an offensive action.

17. The CRSM of claim 15, wherein the determination that the first action is banned from being shown in the video with the first object is executed responsive to the one or more images being generated using a camera.

18. The CRSM of claim 15, wherein the respective proprietary object for the first entry is established by a person's likeness.

19. The CRSM of claim 15, wherein the GUI also suggests, as a replacement for the one or more images from the video, one or more alternate images that were generated within a preset threshold period of time of when the one or more images from the video were generated.

20. The CRSM of claim 19, wherein the instructions are executable to:

use image timestamps to determine that the one or more alternate images were generated within the preset threshold period of time of when the one or more images from the video were generated.

* * * * *